Patented Dec. 4, 1934

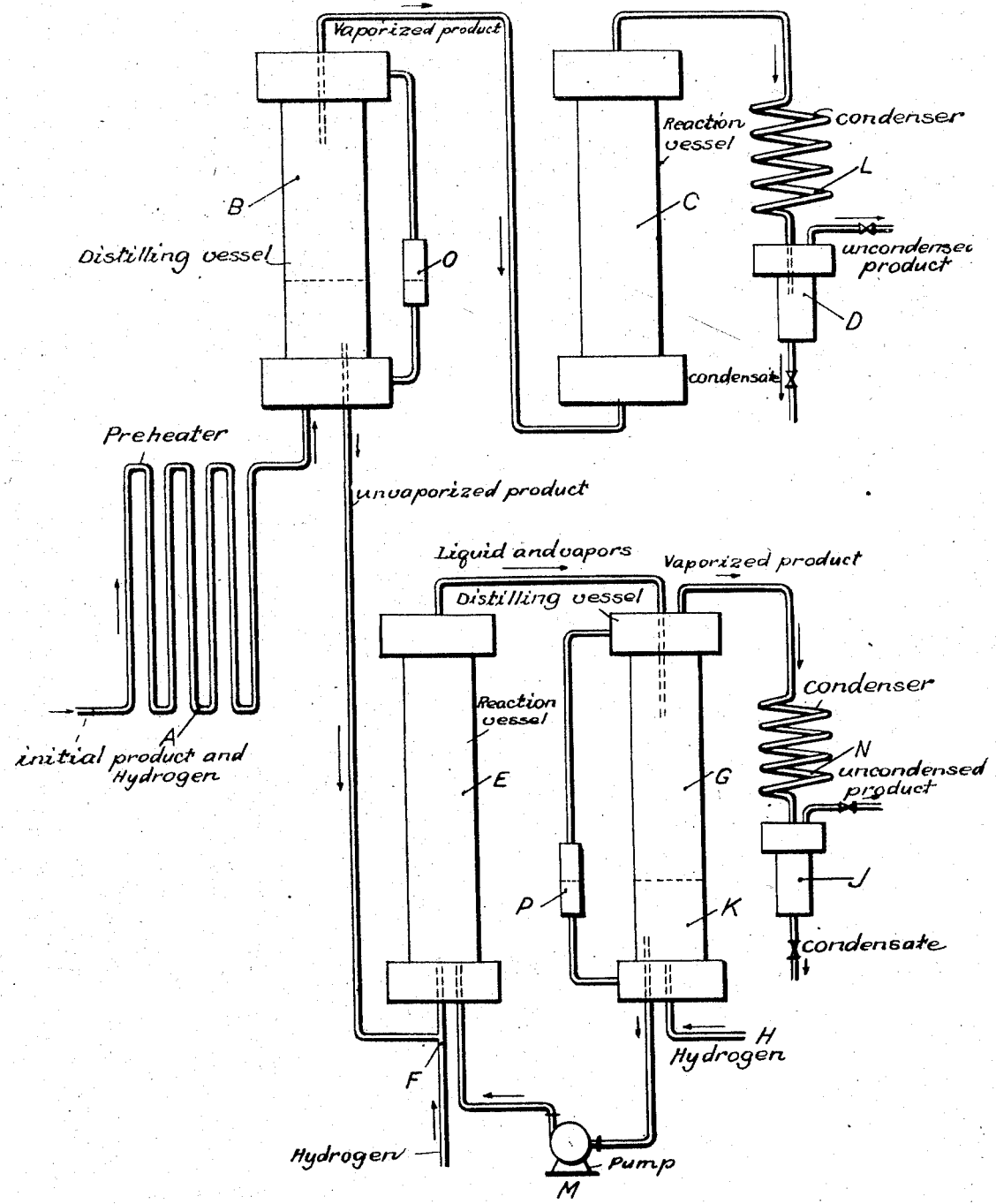

1,983,241

UNITED STATES PATENT OFFICE 1,983,241

PRODUCTION OF LIQUID HYDROCARBON PRODUCTS

Mathias Pier, Heidelberg, and Ernst Donath, Mannheim, Germany, assignors to Standard-I. G. Company, Linden, N. J., a corporation of Delaware Application February 2, 1931, Serial No. 512,778
In Germany February 3, 1930

8 Claims. (Cl. 196—53)

The present invention relates to the production of liquid hydrocarbon products, in particular of lubricating oils.

We have found that in the production of valuable liquid hydrocarbon products, in particular of lubricating oils, by the hydrogenation of distillable carbonaceous materials, such as coals of all varieties, tars, mineral oils and the like, such as the destructive hydrogenation of the said materials or the refining hydrogenation of hydrocarbon oils including raw benzenes, gasoline etc., which hydrogenations are carried out at elevated temperatures, under pressure and with hydrogen or gases containing or supplying hydrogen, if desired in the presence of catalysts, it is very advantageous to insert a distillation under pressure of said materials in the presence of flowing hydrogen, if desired with the addition of other gases or vapours, especially of steam. This distillation under pressure may be effected either with the initial materials before the hydrogenation or with the reaction products after said destructive hydrogenation or also both before and after the destructive hydrogenation. The said distillation is usually carried out at pressures above 5 atmospheres, preferably at 50, 100, 200 or more atmospheres. When distilling the reaction products it is preferable to employ the pressure under which the products are formed. By working in this manner the danger that during the distillation of liquid mixtures to be subjected to hydrogenation or produced in the said process, especially those which contain high molecular and more or less readily decomposable constituents, the distillation materials may be injuriously altered by overheating, as for example with the splitting off of hydrogen, is avoided. In order to utilize the pressure prevailing during the preparation of the products by destructive hydrogenation, any vaporous products leaving the reaction chamber under pressure may be converted into the liquid state by cooling, and then subjected to distillation in the presence of flowing hydrogen or gases containing hydrogen, if desired after partly releasing the pressure.

The above-mentioned destructive hydrogenation is carried out at temperatures usually between 300° and 500° C. and preferably between 370° and 450° C. and at elevated pressures ranging from 50 to 1000 atmospheres. The refining hydrogenation which is also called "hydrofining" is effected at less strong conditions of pressure and temperature and for such a short period of time that no appreciable formation of low-boiling and gaseous hydrocarbons occurs. The temperatures employed in this process are usually above 300° C., but should preferably not exceed 420° C. Pressures of 20 atmospheres or more are usually employed, but it is possible to use higher pressures, for example 100, 200 atmospheres or more.

As gases to be added during the distillation may be mentioned in particular industrial waste gases containing free hydrogen, as for example the gases obtained during the production by destructive hydrogenation of the products to be distilled, which in cases when the substances leaving the reaction chamber are fractionally relieved of pressure are available at different stages of pressure. It may be preferable to introduce the gases into the material through nozzles arranged in the distillation vessel, whereby the pressure of the gases to be introduced is substantially higher than the pressure prevailing in the distillation vessel during the distillation. For example such a difference in pressure may be chosen that when the additional gas enters the liquid to be distilled a considerable release of pressure takes place.

It has been found that the distillation may be carried out in an especially efficient manner when care is taken that the gases to be introduced into the material to be distilled contain liquid substances in a finely divided form, advantageously in the form of mist. These finely divided liquids suddenly evaporate when they enter the distillation pressure under lower pressure, provided the temperature therein is sufficiently high. Water, alcohol, benzene and other volatile hydrocarbons or their mixtures, as for example benzines and the like may, for example, be employed as such liquids.

The process according to the present invention is of especial importance for the isolation and purification of lubricating oils or other oils or tars which have been obtained by destructive hydrogenation of carbonaceous materials.

The distillation according to the present invention may be carried out at the same pressures as those employed in destructive or refining hydrogenation or at lower pressures. The distillation temperatures depend upon the initial materials and on the pressure employed. The destructive hydrogenation for the production of lubricating oils is preferably carried out at temperatures ranging from about 400° to 450° C., at pressures ranging from about 50 to 1000 atmospheres and in the presence of catalysts consisting of the elements of the groups 5 to 7 of the periodic system or compounds thereof or compounds of alkali metals or alkaline earth metals as such or in admixture with other elements, such as zinc, magnesium or compounds thereof, which catalysts may also be employed on carriers such as active carbon, silica gel and the like.

The following example given with reference to the accompanying drawing showing diagrammatically a side elevation of a plant for the production of lubricating oil will further illustrate the nature of this invention, but the invention is not restricted to this example, nor to the specific arrangement shown in the drawing.

*Example*

A German crude oil freed from constituents boiling below 325° C. is preheated to 400° C. together with hydrogen under a pressure of 200 atmospheres in a preheater A heated with hot gases and is continuously led therefrom into a distillation column B in which, if desired by further heating, a fractionating distillation takes place by which any middle oils and the lighter fractions having lubricating properties are carried off by the gases streaming therethrough. The higher molecular fractions and the asphalts remain at the bottom of B. The content of liquids in B may be observed through show glass O. The vaporized constituents are withdrawn together with hydrogen and are led at the same temperature and under the same pressure over a catalyst consisting of molybdic acid, zinc oxide and magnesia which is rigidly arranged in a high pressure vessel C. A product which in addition to gas oil and benzine contains 40 per cent of spindle oil and machine oil is condensed in the condenser L and collected in the vessel D. The constituents containing asphalt remaining in the liquid state in the distillation column are treated with hydrogen in the liquid phase at 430° C. under a pressure of 200 atmospheres in a separate vessel E with the addition of a finely divided catalyst consisting of molybdic acid, chromic acid and manganese carbonate which is made up to a paste with oil and then introduced together with hydrogen into the vessel E at F. The liquid and vaporous products leaving the vessel E are continuously led under the prevailing pressure together with the excess of hydrogen into an adjacent distilling vessel G and distilled analogously as in vessel B together with hydrogen supplied in counter current at H at a temperature of about from 435° to 440° C. The distillate condensed in cooler N and collected in the vessel J consists of equal parts of spindle oil and machine oil and constituents of lower boiling point. The distillation residue K containing the catalyst and the level of which is controlled by show glass P is pumped by means of the pump M into the vessel E where it is again subjected together with the asphalt-containing constituents issuing from the column B to destructive hydrogenation.

What we claim is:—

1. In the production of valuable liquid hydrocarbons from a distillable carbonaceous material comprising substantial amounts of higher boiling hydrocarbons, the steps of preheating the initial material by indirect heat exchange with a heating medium to a temperature at which it will vaporize to the desired extent by the aid of hydrogen in amounts sufficient to exert a partial pressure of at least 5 atmospheres, passing said preheated material into a vaporizing zone without the addition thereto of any other carbonaceous material, conducting the vaporization in the vaporizing zone under the aforesaid partial pressure of hydrogen in the absence of catalysts promoting a chemical conversion, separately removing the vaporous and liquid material from said zone before substantial conversion under the conditions maintained in said zone can take place and then directly subjecting the liquid material in an independent zone to a treatment with hydrogen under a temperature and pressure of the order used in destructive hydrogenation.

2. The process according to the preceding claim in which the treatment to which the liquid material is subjected is a treatment with hydrogen at a temperature between 300° and 420° under a pressure of at least 20 atmospheres for such a short period of time that no substantial formation of low-boiling and gaseous hydrocarbons occurs.

3. A process according to claim 1 in which the treatment to which the liquid material is subjected is a destructive hydrogenation at a temperature between 400° and 450° C., under a pressure between 50 and 1000 atmospheres and in the presence of a catalyst selected from the group consisting of elements of groups 5 to 7 of the periodic system and compounds thereof and compounds of alkali metals and alkaline earth metals.

4. A process according to claim 1 in which the hydrogen is employed during the vaporizing step in the form of a stream passing through the material to be vaporized.

5. In the production of valuable liquid hydrocarbons from a distillable carbonaceous material comprising substantial amounts of higher boiling hydrocarbons, the steps of preheating the initial material by indirect heat exchange with a heating medium to a temperature at which it will vaporize to the desired extent by the aid of hydrogen in amounts sufficient to exert a partial pressure of at least 5 atmospheres passing said preheated material into a vaporizing zone without the addition thereto of any other carbonaceous material, conducting the vaporization in the vaporizing zone under the aforesaid partial pressure of hydrogen in the absence of catalysts promoting a chemical conversion, separately removing the vaporous and liquid material from such zone before substantial conversion under the conditions maintained in said zone can take place and then destructively hydrogenating the vaporous material and the liquid material separately in independent zones and under different conditions.

6. A process according to the preceding claim in which the conditions employed for the destructive hydrogenation of the vaporous material are a temperature between 300° and 500° C. and a pressure between 50 and 1000 atmospheres and the conditions employed for the destructive hydrogenation of the liquid material are more vigorous in at least one respect than those employed for the vaporous material.

7. In the production of valuable liquid hydrocarbons from a distillable carbonaceous material comprising substantial amounts of higher boiling hydrocarbons, the steps of preheating the initial material by indirect heat exchange with a heating medium to a temperature of about 400° C., vaporizing the initial material in a vaporization zone maintained under a hydrogen pressure of about 200 atmospheres, in the absence of catalysts promoting a chemical conversion, separately removing the vaporous and liquid material from said zone before substantial conversion under the conditions maintained in said zone can take place, destructively hydrogenating the vaporous material at a temperature of about 400° C. and under a pressure of about 15

200 atmospheres in the presence of a catalyst consisting of molybdic acid, zinc oxide and magnesia and separately destructively hydrogenating the liquid material at a temperature of about 430° C. under a pressure of about 200 atmospheres in the presence of a catalyst consisting of molybdic acid, chromic acid and manganese carbonate.

8. The process according to the preceding claim in which the liquid product issuing from the destructive hydrogenation of the liquid material is subjected to fractionation by distillation under a pressure of about 200 atmospheres at a temperature of about 430° C. while a stream of hydrogen is passed therethrough.

MATHIAS PIER.
ERNST DONATH.